US011263351B2

(12) United States Patent
Olrog (10) Patent No.: US 11,263,351 B2
(45) Date of Patent: Mar. 1, 2022

(54) VERIFICATION OF SERVICE ACCESS IN A COMMUNICATIONS SYSTEM (71) Applicant: Telefonaktiebolaget LM Ericsson (publ), Stockholm (SE)

(72) Inventor: Christian Olrog, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 142 days.

(21) Appl. No.: 15/773,021

(22) PCT Filed: Nov. 13, 2015

(86) PCT No.: PCT/SE2015/051213
§ 371 (c)(1),
(2) Date: May 2, 2018

(87) PCT Pub. No.: WO2017/082790
PCT Pub. Date: May 18, 2017

(65) Prior Publication Data
US 2018/0322312 A1 Nov. 8, 2018

(51) Int. Cl.
*G06F 21/64* (2013.01)
*H04L 9/32* (2006.01)
(Continued)

(52) U.S. Cl.
CPC .......... *G06F 21/645* (2013.01); *G06F 21/552* (2013.01); *H04L 9/0643* (2013.01);
(Continued)

(58) Field of Classification Search
CPC .... G06F 21/552; G06F 21/604; G06F 21/645; G06F 2221/2115; G06F 2221/2151
See application file for complete search history.

(56) References Cited

U.S. PATENT DOCUMENTS

2002/0184507 A1* 12/2002 Makower ................ H04L 63/12
713/182
2007/0220605 A1* 9/2007 Chien .................... G06F 21/552
726/23
(Continued)

FOREIGN PATENT DOCUMENTS

EP 2897051 A2 7/2015
WO 0048061 A1 8/2000
(Continued)

OTHER PUBLICATIONS

Extended European Search Report for European Patent Application No. 15908401.1, dated Aug. 30, 2018, 7 pages.
(Continued)

*Primary Examiner* — Ellen Tran
(74) *Attorney, Agent, or Firm* — Withrow & Terranova, PLLC (57) ABSTRACT There is provided mechanisms for verifying a log entry in a communications system. A method is performed by a host server. The method comprises obtaining a log entry of a service access tracker. The log entry indicates access to a service during a client session, the service being tracked by the service 5 access tracker. The method comprises providing the log entry to a trusted third party for digital signing thereof using a digital trusted timestamping scheme. The method comprises verifying that the log entry has been digitally signed by the trusted third party. The method comprises providing a new aggregate comprising the digitally signed log entry and a previous aggregate 10 of previously digitally signed and aggregated log entries to the trusted third party for digital signing thereof using the digital trusted timestamping scheme. The method comprises verifying that the new aggregate has been digitally signed by the trusted third party.

22 Claims, 4 Drawing Sheets (51) Int. Cl.
*G06F 21/55* (2013.01)
*H04L 9/06* (2006.01)

(52) U.S. Cl.
CPC ............ *H04L 9/321* (2013.01); *H04L 9/3236* (2013.01); *H04L 9/3297* (2013.01); *G06F 2221/2101* (2013.01); *G06F 2221/2105* (2013.01); *G06F 2221/2115* (2013.01); *G06F 2221/2141* (2013.01); *G06F 2221/2151* (2013.01); *H04L 2209/38* (2013.01)

(56) References Cited

U.S. PATENT DOCUMENTS

2010/0325097 A1* 12/2010 Er .......................... G06F 21/629
  707/702
2014/0245020 A1 8/2014 Buldas et al.

FOREIGN PATENT DOCUMENTS

WO  2012112095 A1  8/2012
WO  2012162843 A1  12/2012

OTHER PUBLICATIONS

Buldas, A., et al., "Keyless Signatures' Infrastructure: How to Build Global Distributed Hash-Trees," Secure IT Systems, vol. 8208, Oct. 18, 2013, 9 pages.
International Search Report and Written Opinion for International Patent Application No. PCT/SE2015/051213, dated Aug. 24, 2016, 17 pages.

* cited by examiner

VERIFICATION OF SERVICE ACCESS IN A COMMUNICATIONS SYSTEM

This application is a 35 U.S.C. § 371 national phase filing of International Application No. PCT/SE2015/051213, filed Nov. 13, 2015, the disclosure of which is incorporated herein by reference in its entirety.

TECHNICAL FIELD

Embodiments presented herein relate to a method, a host server, a computer program, and a computer program product for verifying a log entry in a communications system.

BACKGROUND

In communications systems, there may be a challenge to obtain good performance and for a given communications protocol, its parameters and the environment in which the communications system is deployed.

For example, one parameter in providing good performance for a given communications system is the ability to verify what services provided by the communications system that have been accessed.

One example of a communications system where services are available is a communications system comprising host servers where the host servers host virtual machines. In general terms, a virtual machine can be regarded as an emulation of a particular computer system. Virtual machines operate based on the computer architecture and functions of a real or hypothetical computer, and their implementations may involve specialized hardware, software, or a combination of both.

Classification of virtual machines can be based on the degree to which they implement functionality of targeted real machines. That way, system virtual machines (also known as full virtualization virtual machines) provide a complete substitute for the targeted real machine and a level of functionality required for the execution of a complete operating system. On the other hand, process virtual machines are designed to execute a single computer program by providing an abstracted and platform-independent program execution environment.

Known mechanisms for verifying what services provided by the communications system that have been accessed cannot be used if the services are run by virtual machines hosted by host servers in the communications system since the typical hardware fingerprint mechanism can typically be replicated by copying a virtual machine.

Hence, there is a need for an improved verification of what services provided by the communications system that have been accessed.

SUMMARY

An object of embodiments herein is to provide efficient verification of what services provided by the communications system that have been accessed.

According to a first aspect there is presented a method for verifying a log entry in a communications system. The method is performed by a host server. The method comprises obtaining a log entry of a service access tracker. The log entry indicates access to a service during a client session, the service being tracked by the service access tracker. The method comprises providing the log entry to a trusted third party for digital signing thereof using a digital trusted timestamping scheme. The method comprises verifying that the log entry has been digitally signed by the trusted third party. The method comprises providing a new aggregate comprising the digitally signed log entry and a previous aggregate of previously digitally signed and aggregated log entries to the trusted third party for digital signing thereof using the digital trusted timestamping scheme. The method comprises verifying that the new aggregate has been digitally signed by the trusted third party.

According to a second aspect there is presented a host server for verifying a log entry in a communications system. The host server comprises processing circuitry. The processing circuitry is configured to cause the host server to obtain a log entry of a service access tracker. The log entry indicates access to a service during a client session, the service being tracked by the service access tracker. The processing circuitry is configured to cause the host server to provide the log entry to a trusted third party for digital signing thereof using a digital trusted timestamping scheme. The processing circuitry is configured to cause the host server to verify that the log entry has been digitally signed by the trusted third party. The processing circuitry is configured to cause the host server to provide a new aggregate comprising the digitally signed log entry and a previous aggregate of previously digitally signed and aggregated log entries to the trusted third party for digital signing thereof using the digital trusted timestamping scheme. The processing circuitry is configured to cause the host server to verify that the new aggregate has been digitally signed by the trusted third party.

According to a third aspect there is presented a host server for verifying a log entry in a communications system. The host server comprises processing circuitry. The host server comprises a computer program product. The computer program product stores instructions that, when executed by the processing circuitry, causes the host server to perform steps, or action. One action involves the host server to obtain a log entry of a service access tracker. The log entry indicates access to a service during a client session, the service being tracked by the service access tracker. One action involves the host server to provide the log entry to a trusted third party for digital signing thereof using a digital trusted timestamping scheme. One action involves the host server to verify that the log entry has been digitally signed by the trusted third party. One action involves the host server to provide a new aggregate comprising the digitally signed log entry and a previous aggregate of previously digitally signed and aggregated log entries to the trusted third party for digital signing thereof using the digital trusted timestamping scheme. One action involves the host server to verify that the new aggregate has been digitally signed by the trusted third party.

According to a fourth aspect there is presented a host server for verifying a log entry in a communications system. The host server comprises an obtain module configured to obtain a log entry of a service access tracker. The log entry indicates access to a service during a client session, the service being tracked by the service access tracker. The host server comprises a provide module configured to provide the log entry to a trusted third party for digital signing thereof using a digital trusted timestamping scheme. The host server comprises a verify module configured to verify that the log entry has been digitally signed by the trusted third party. The provide module is further configured to provide a new aggregate comprising the digitally signed log entry and a previous aggregate of previously digitally signed and aggregated log entries to the trusted third party for digital signing thereof using the digital trusted timestamping scheme. The verify module is further configured to verify that the new aggregate has been digitally signed by the trusted third party.

According to a fifth aspect there is presented a computer program for verifying a log entry in a communications system, the computer program comprising computer program code which, when run on a host server, causes the host server to perform a method according to the first aspect.

According to a sixth aspect there is presented a computer program product comprising a computer program according to the fifth aspect and a computer readable storage medium on which the computer program is stored. The computer readable storage medium can be a non-transitory computer readable storage medium.

Advantageously this method, these host servers, and this computer program provide efficient verification of what services provided by the communications system that have been accessed.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
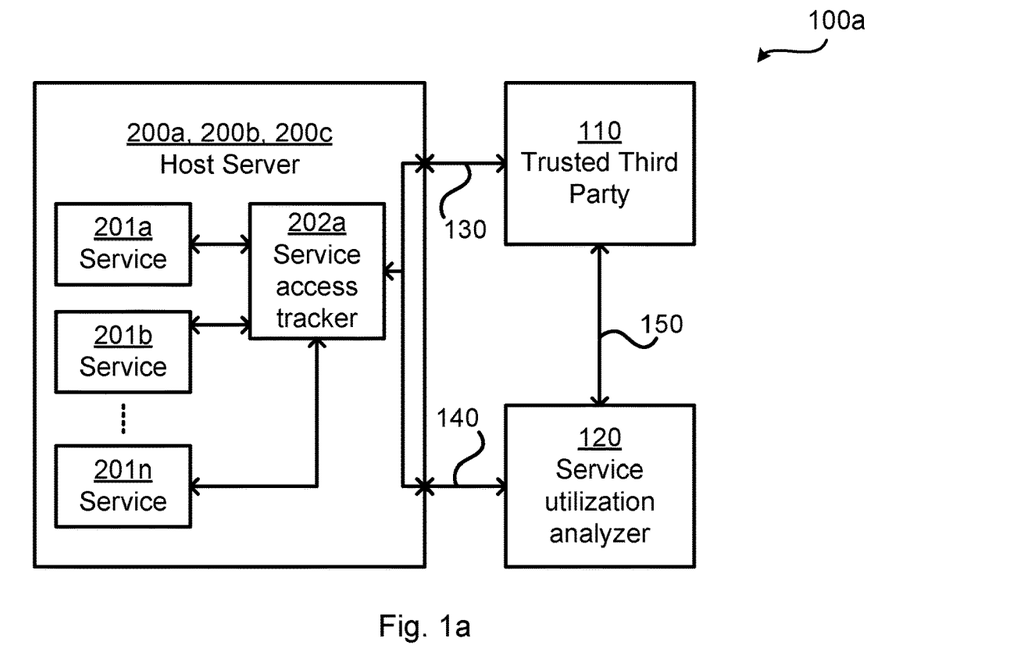
FIGS. 1a and 1b are schematic diagrams illustrating a communications system according to embodiments.

FIG. 1a is a schematic diagram illustrating a communications system 100a where embodiments presented herein can be applied. The communications system 100a comprises a host server 200a, 200b, 200c, a trusted third party 110 and a service utilization analyser 120. The host server 200a, 200b, 200C and the trusted third party 110 are configured to communicate over interface 130, the host server 200a, 200b, 200c and the service utilization analyser 120 are configured to communicate over interface 140, and the trusted third party 110 and the service utilization analyser 120 are configured to communicate over interface 150. The host server 200a, 200b, 200c is configures to run at least one service 201a, . . . , 201n. Access to the at least one service 201a, . . . , 201n is tracked by a service access tracker 202a.

Figure 1B:
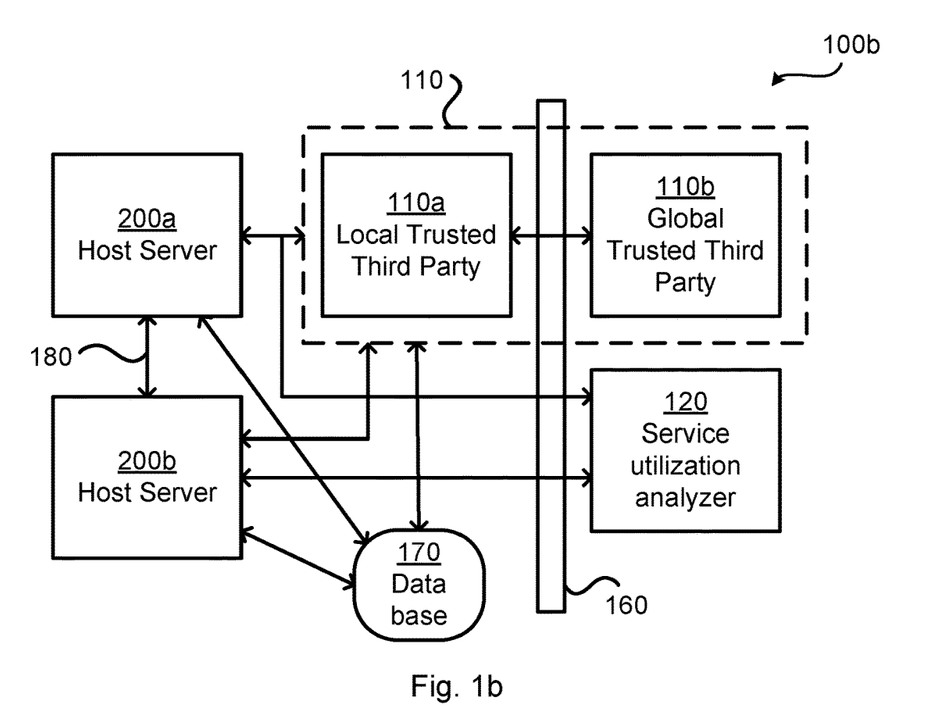

FIG. 1b is a schematic diagram illustrating a communications system 100b where embodiments presented herein can be applied. The communications system 100b is similar to the communications system 100a but comprises two host servers 200a, 200b operatively connected by an interface 180, and a database 170. Further, the trusted third party 110 is divided into a local trusted third party 110a and a global trusted third party 110b. The local trusted third party 110a and the global trusted third party 110b are separated by a firewall 160, and the local trusted third party 110a is logically located at the same side of the firewall 160 as the host servers 200a, 200b.

Figure 1C:
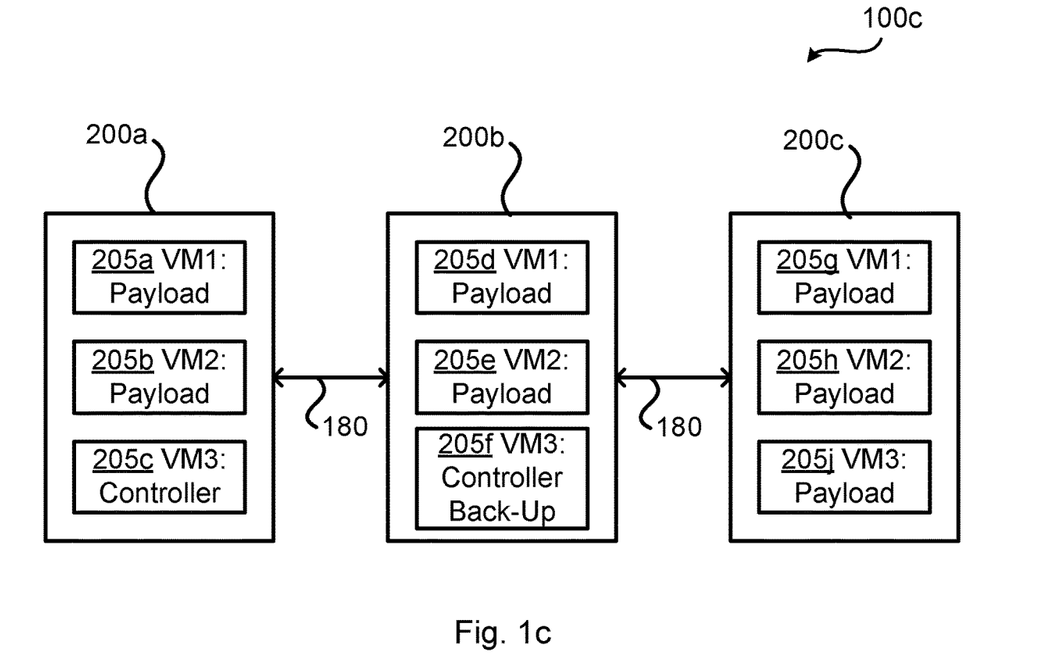
FIG. 1c is a schematic diagram illustrating server hosts according to an embodiment.

FIG. 1c is a schematic diagram illustrating a communications system 100c where embodiments presented herein can be applied. The communications system 100c comprises host servers 200a, 200b, 200c, where each host server 200a, 200b, 200c is configured to host a set of virtual machines (VMs) 205a, . . . , 205j. The host servers 200a, 200b, 200c can collectively be regarded as one system. In this system one of the host servers (such as host server 200a) can be configured to act as a master host server and run a virtual machine (such as VM3 of host server 200a) acting as a controller of the remaining virtual machines. Further, another one of the host servers (such as host server 200b) can be configured to run a back-up of the controller (such as VM3 of host server 200b).

The host server 200a, 200b, 200c is configured to run at least one service 201a, . . . , 201n. A log entry is issued each time a service 201a, . . . , 201n is accessed. The service may be run by at least one of the virtual machines 205a, . . . , 205j of the host server 200a, 200b, 200c. Hence, each payload of the virtual machines 205a, . . . , 205j can correspond to execution of a service 201a, . . . , 201n.

The embodiments disclosed herein relate to verifying the log entry in the communications system 100a, 100b. In order to obtain such verification there is provided a host server 200a, 200b, 200c, a method performed by the host server 200a, 200b, 200c, a computer program product comprising code, for example in the form of a computer program, that when run on a host server 200a, 200b, 200c, causes the host server 200a, 200b, 200c to perform the method.

Figure 4:
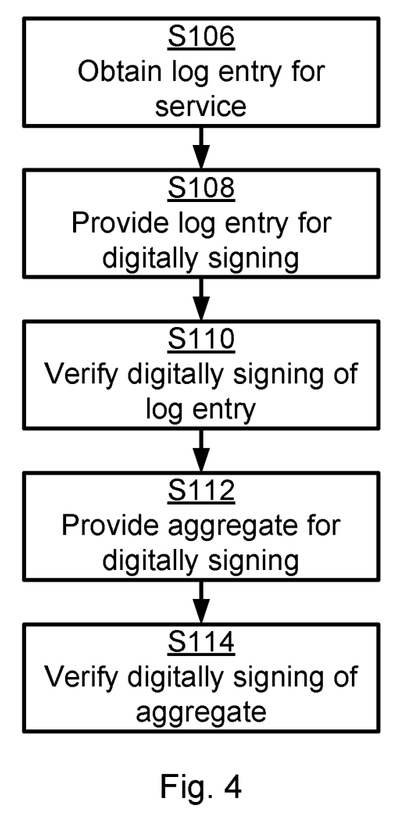
FIGS. 4 and 5 are flowcharts of methods according to embodiments.
Figure 5:
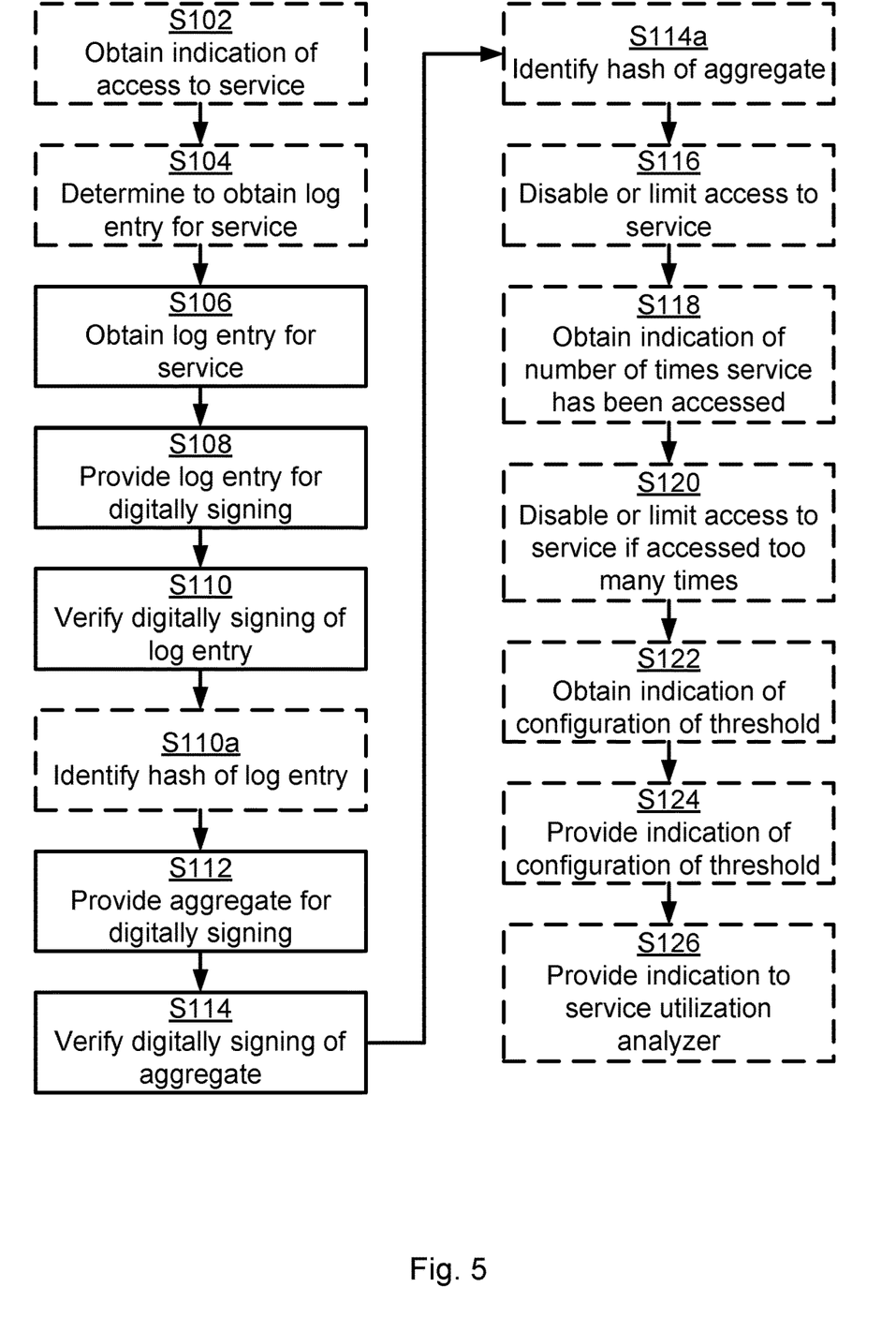

FIGS. 4 and 5 are flow chart illustrating embodiments of methods for verifying a log entry in a communications system 100a, 100b. The methods are performed by the host server 200a, 200b, 200c. The methods are advantageously provided as computer programs 320.

Reference is now made to FIG. 4 illustrating a method for verifying a log entry in a communications system 100a, 100b as performed by the host server 200a, 200b, 200c according to an embodiment. Parallel reference is continued to FIGS. 1a-1c.

S106: The host server 200a, 200b, 200c obtains a log entry of a service access tracker 202a. The log entry indicates access to a service 201a, ..., 201n during a client session, the service 201a, ..., 201n being tracked by the service access tracker 202a. In this respect, access can be made at at least one occurrence during the client session. The log entry can be defined to include multiple accesses or a single access to the service 201a, ..., 201n during the client session. In this respect each individual access to the service 201a, ..., 201n can thus be logged separately.

S108: The host server 200a, 200b, 200c provides the log entry to a trusted third party 110, 110a, 110b for digital signing thereof using a digital trusted timestamping scheme. That is, the trusted third party 110, 110a, 110b digitally signs the log entry using the digital trusted timestamping scheme. Examples of digital trusted timestamping schemes will be provided below.

S110: The host server 200a, 200b, 200c verifies that the log entry has been digitally signed by the trusted third party 110, 110a, 110b. Examples of how to implement the verification performed in step S110 will be provided below, see for example step S110a.

S112: The host server 200a, 200b, 200c provides a new aggregate comprising the digitally signed log entry and a previous aggregate of previously digitally signed and aggregated log entries to the trusted third party 110, 110a, 110b for digital signing thereof using the digital trusted timestamping scheme. That is, the trusted third party 110, 110a, 110b digitally signs the signed log entry and the previous aggregate.

S114: The host server 200a, 200b, 200c verifies that the new aggregate has been digitally signed by the trusted third party 110, 110a, 110b. Examples of how to implement the verification performed in step S114 will be provided below, see for example step S114a.

Embodiments relating to further details of verifying a log entry in a communications system 100a, 100b as performed by the host server 200a, 200b, 200c will now be disclosed.

According to an embodiment the service is run on a virtual machine 205a-205j hosted by the host server 200a, 200b, 200c.

There may be different examples of log entries. For example, the log entry can correspond to a feature tracker entry or a feature tracker record.

There may be different examples of service access. For example, the service access can correspond to a feature activation, a feature usage or a feature utilization.

There may be different examples of services 201a, ..., 201n. For example, the service 201a, ..., 201n tracked by the service access tracker 202a can be a voice mail system service, a call system service, or a web service. Hence, the client session can be a client session during which a voice mail system service, a call system service, and/or a web service is accessed.

There may be different examples of communications systems 100a, 100b. For example, the communications systems 100a, 100b can be telecommunications systems.

There may be different examples of trusted third parties 110, 110a, 110b. For example, the trusted third party 110, 110a, 110b can be a Keyless Signature Infrastructure (KSI). A KSI logging construct can thereby be used for providing persistent non-tamperable and irrefutable evidence of access to the service. The KSI can thus be utilized to produce frequent irrefutable evidence of what service 201a, ..., 201n has been tracked and how many occurrences of the service 201a, ..., 201n have been accessed, combined with a construct that validates the aggregate usage signature.

In general terms, according to the RFC 3161 standard, a trusted timestamp is a timestamp issued by a trusted third party 110, 110a, 110b acting as a Time Stamping Authority (TSA). It is used to prove the existence of the log entry without the possibility that the owner can backdate the timestamps. Multiple TSAs can be used to increase reliability and reduce vulnerability. The ANSI ASC X9.95 Standard for trusted timestamps augments the RFC 3161 standard with data-level security requirements to ensure data integrity against a reliable time source that is provable to any third party. There may be different examples of digital trusted timestamping schemes. For example the digital trusted timestamping scheme can be a hash-linking based digital timestamping scheme. In general terms, linked timestamping creates timestamp tokens which are dependent on each other, entangled into some authenticated data structure. Later modification of issued time-stamps would invalidate this structure. Temporal order of issued timestamps is also protected by this data structure, making backdating of the issued time-stamps impossible, even by the issuing server itself. In linked timestamping there are no (long-term) private keys in use, avoiding public key infrastructure (PKI) related risks. The hash-linking based digital timestamping scheme can be a hash calendar. In general terms, a hash calendar is a data structure that is used to measure the passage of time by adding hash values to an append-only database with one hash value per elapsed second. It can be thought of special kind of hash tree (or Merkle tree), with the property that at any given moment, the tree contains a leaf node for each second since 1970-01-01 00:00:00 UTC. The leaves of the hash tree are numbered left to right starting from zero and new leaves are always added to the right. By periodically publishing the root of the hash-tree is it possible to use a hash calendar as the basis of the hash-linking based digital timestamping scheme.

The host server 200a, 200b, 200c can be configured to collect values that could isolate the particular one occurrence of access to the service 201a, ..., 201n from identical occurrences of access to the service 201a, ..., 201 running in parallel. Therefore, according to an embodiment the log entry comprises at least one of a boot timestamp, a timestamp of start of access to the service, and a random number having been generated at the start of the service 201a, ..., 201n. Additional or alternative values that could isolate the particular one occurrence of access to the service 201a, ..., 201n could further be collected. Particularly, according to an embodiment the log entry additionally or alternatively comprises at least one of a virtual hardware identifier, a Media Access Control (MAC) address, and an Internet Protocol (IP) address of a virtual machine running the service 201a, ..., 201n. The collected values are determined at start-up of the service 201a, ..., 201 (i.e., not necessarily when access is made to the service 201a, ..., 2001n) since the random number is to remain constant for as long as possible such that it can be used during validation of the log entry.

There may be different ways that the log entry can be provided to the trusted third party 110, 110a, 110b in step S108. For example, the host server 200a, 200b, 200C can be configured to provide the log entry as a cryptographic hash of the log entry to the trusted third party 110, 110a, 110b for digital signing.

There may be different ways to generate the aggregate of previously digitally signed log entries. For example, the aggregate of previously digitally signed to log entries can comprise previously digitally signed log entries that have been aggregated during a predefined time period. This can enable verification that no single log entry has been removed during this time period. The time period can correspond to one day. Hence one instant of aggregate of previously digitally signed log entries can comprise previously digitally signed log entries that have been aggregated during one day.

The host server 200a, 200b, 200C can be configured to verify that the log entries submitted for signing by the trusted third party 110, 110a, 110b are indeed available/accounted for on a global hash calendar within a preconfigured time and otherwise take some action. Examples of such actions will be disclosed below with reference to steps S115 and S120. Hence, the step of verifying that the new aggregate has been digitally signed (as in step S114) can be performed within a predefined time duration from the step of providing the new aggregate to the trusted third party 110, 110a, 110b for digital signing (as in step S112).

Reference is now made to FIG. 5 illustrating methods for verifying a log entry in a communications system 100a, 100b as performed by the host server 200a, 200b, 200c according to further embodiments. It is assumed that steps S106-S114 are performed as disclosed above and a repetition of these steps are therefore omitted. Parallel reference is continued to FIGS. 1a-1c.

Whenever the service of the communications system 100a, 100 is accessed it can be determined if a particular license is required and if so the log entry is created. According to an embodiment the method therefore comprises steps S102 and S104 as defined below:

S102: The host server 200a, 200b, 200C obtains an indication that the service 201a, . . . , 201n tracked by the service access tracker 202a has been accessed.

S104: The host server 200a, 200b, 200C determines, in response to having obtained the indication in step S102, whether to obtain the log entry or not.

Hence, steps S102 and S104 can be regarded as triggers for the host server 200a, 200b, 200c to perform step S106.

In order to implement steps S102 and S104 the host server 200a, 200b, 200c can be configured to determine license criteria according to state of the art licensing, for example licensing in specific steps of number of transactions per second of a service 201a, . . . , 201n or group of services 201a, . . . , 201n being accessed.

Embodiments for verifying that the log entry has been digitally signed by the trusted third party 110, 110a, 110b and for verifying that the new aggregate has been digitally signed by the trusted third party 110, 100a, 110b will now be disclosed.

A hash of the log entry can be identified in a top hash of a hash tree provided by the trusted third party 110, 110a, 110b. According to an embodiment the method therefore comprises step S110a as defined below:

S110a: The host server 200a, 200b, 200c identifies a hash of the log entry in a top hash of a hash tree provided by the trusted third party 110, 110a, 110b, thereby verifying that the log entry has been digitally signed by the trusted third party 110, 110a, 110b.

Step S110a can be performed as part of above disclosed step S110.

A hash of the new aggregate can be identified in a top hash of a hash tree provided by the trusted third party 110, 110a, 110b. According to an embodiment the method therefore comprises step S114a as defined below:

S114a: The host server 200a, 200b, 200c identifies a hash of the new aggregate in a top hash of a hash tree provided by the trusted third party 110, 110a, 110b, thereby verifying that the new aggregate has been digitally signed by the trusted third party 110, 110a, 110b.

Step S114a can be performed as part of above disclosed step S114.

The host server 200a, 200b, 200c can thereby act as a KSI gateway, whereby the host server 200a, 200b, 200c provides a local KSI root that can periodically be submitted to a global KSI, and whereby the host server 200a, 200b, 200c imports and makes this KSI signature tree available to local nodes without direct connection to outside world, thereby ensuring security.

According to an embodiment the host server 200a, 200b, 200c can limit access to the service 201a, . . . , 201n if no response from the trusted third party 110, 110a, 110b of any of the validations in steps S110 and S114 fails (that is, if the host server 200a, 200b, 200c is unable to validate that the log entry has been digitally signed and/or that the new aggregate has been digitally signed). According to this embodiment the method therefore comprises step S116 as defined below:

S116: The host server 200a, 200b, 200c disables or limits access to the service 201a, . . . , 201n in case verification of at least one of the log entry and the new aggregate is not obtained.

Further, according to an embodiment the host server 200a, 200b, 200c can limit access to the service 201a, . . . , 201n based on voluntary configuration (i.e., not due to locked licenses). Hence the host server 200a, 200b, 200c can support an inter instance voluntary service limitation (i.e., a voluntary limitation of access to the service 201a, . . . , 201n). This can be achieved by the host server 200a, 200b, 200c collecting log entries from occurrences of access to the service 201a, . . . , 201n so as to determine how many times the service 201a, . . . , 201n has been accessed, and making this information known by providing the information of how many times the service 201a, . . . , 201n has been accessed to the database 170. The host server 200a, 200b, 200C can could provide the information using a peer-to-peer distributed mechanism using e.g. publish subscribe queueing mechanisms or a centralized mechanism. According to this embodiment the method therefore comprises steps S118 and S120 as defined below:

S118: The host server 200a, 200b, 200c obtains an indication of how many times the service 201a, . . . , 201n has been accessed.

S120: The host server 200a, 200b, 200c disables or limits access to the service 201a, . . . , 201n if the service 201a, . . . , 201n has been accessed more times than defined by a predefined threshold.

There are different examples of how the access to the service 201a, . . . , 201n can be disabled or limited. Examples include, but are not limiting to, lowering the quality of service (QoS) of the service 201a, . . . , 201n, and disabling some or all features of the service 201a, . . . , 201n. Instructions for how the access to the service 201a, . . . , 201n can be disabled or limited can be stored in the database 170.

The host server 200a, 200b, 200C can be configured to log any changes to voluntary configuration of limits to the trusted third party 110, 110a, 110b. According to such an embodiment the method therefore comprises steps S122 and S124 as defined below:

S122: The host server 200a, 200b, 200c obtains an indication of configuration of the predefined threshold (as used in step S120).

S124: The host server 200a, 200b, 200c provides the indication to the trusted third party 110, 110a, 110b for digital signing thereof (i.e., of the indication of configuration of the predefined threshold). The trusted third party 110, 110*a*, 110*b* then digitally signs the indication of configuration of the predefined threshold using the digital trusted timestamping scheme.

The host server 200*a*, 200*b*, 200*c* can be configured to import an exported and validated log entry and analyze historical service access and perform functions relating to rating, charging and billing. According to such an embodiment the method therefore comprises step S126 as defined below:

S126: The host server 200*a*, 200*b*, 200*c* provides an indication of the log entry to a service utilization analyzer 120. The indication can be the digitally signed log entry itself. The service utilization analyzer 120 could be part of, or to operatively connected to, a policy and charging rules function (PCRF) entity.

Figure 2A:
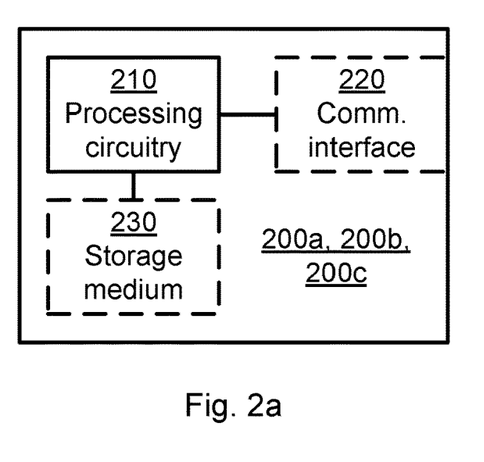
FIG. 2a is a schematic diagram showing functional units of host server according to an embodiment.

FIG. 2*a* schematically illustrates, in terms of a number of functional units, the components of a host server 200*a*, 200*b*, 200*c* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the host server 200*a*, 200*b*, 200*c* to perform the set of operations, or steps, S102-S126. For example, the storage medium 230 may store the set of operations, and the processing circuitry 210 may be configured to retrieve the set of operations from the storage medium 230 to cause the host server 200*a*, 200*b*, 200*c* to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The host server 200*a*, 200*b*, 200*c* may further comprise a communications interface 220 for communications with other entities, such as the trusted third party 110, 110*a*, 110*b*, the service utilization analyser 120, the database 170, and at least one other host server 200*a*, 200*b*, 200*c*.

As such the communications interface 220 may comprise one or more transmitters and receivers, comprising analogue and digital components. The processing circuitry 210 controls the general operation of the host server 200*a*, 200*b*, 200*c* e.g. by sending data and control signals to the communications interface 220 and the storage medium 230, by receiving data and reports from the communications interface 220, and by retrieving data and instructions from the storage medium 230. Other components, as well as the related functionality, of the host server 200*a*, 200*b*, 200*c* are omitted in order not to obscure the concepts presented herein.

Figure 2B:
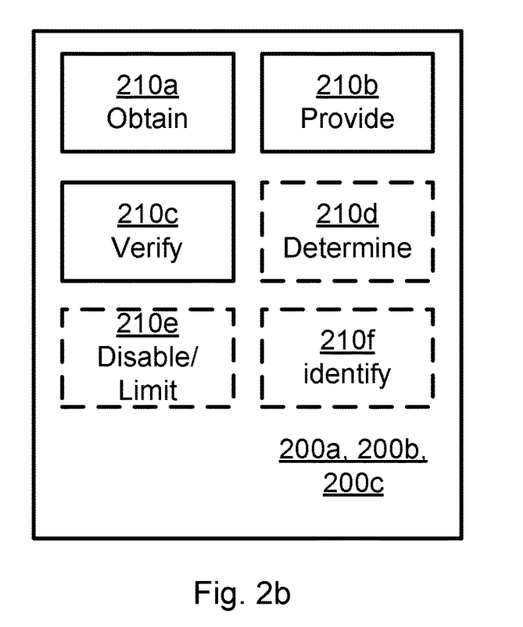
FIG. 2b is a schematic diagram showing functional modules of a host server according to an embodiment.

FIG. 2*b* schematically illustrates, in terms of a number of functional modules, the components of a host server 200*a*, 200*b*, 200*c* according to an embodiment. The host server 200*a*, 200*b*, 200*c* of FIG. 2*b* comprises a number of functional modules; an obtain module 210*a* configured to perform steps S102, S106, S118, S122, a provide module 210*b* configured to perform steps S108, S112, S124, and a verify module 210*c* configured to perform steps S110, S114. The host server 200*a*, 200*b*, 200*c* of FIG. 2*b* may further comprises a number of optional functional modules, such as any of a determine module 210*d* configured to perform step S104, a disable/limit module 210*e* configured to perform steps S116, S120, and an identify module 210*f* configured to perform steps S110*a*, S114*a*. In general terms, each functional module 210*a*-210*f* may in one embodiment be implemented only in hardware or and in another embodiment with the help of software, i.e., the latter embodiment having computer program instructions stored on the storage medium 230 which when run on the processing circuitry makes the host server 200*a*, 200*b*, 200*c* perform the corresponding steps mentioned above in conjunction with FIG. 2*b*. It should also be mentioned that even though the modules correspond to parts of a computer program, they do not need to be separate modules therein, but the way in which they are implemented in software is dependent on the programming language used. Preferably, one or more or all functional modules 210*a*-210*f* may be implemented by the processing circuitry 210, possibly in cooperation with functional units 220 and/or 230. The processing circuitry 210 may thus be configured to from the storage medium 230 fetch instructions as provided by a functional module 210*a*-210*f* and to execute these instructions, thereby performing any steps as will be disclosed hereinafter.

The host server 200*a*, 200*b*, 200*c* may be provided as a standalone device or as a part of at least one further device. Thus, a first portion of the instructions performed by the host server 200*a*, 200*b*, 200*c* may be executed in a first device, and a second portion of the of the instructions performed by the host server 200*a*, 200*b*, 200*c* may be executed in a second device; the herein disclosed embodiments are not limited to any particular number of devices on which the instructions performed by the host server 200*a*, 200*b*, 200*c* may be executed. Hence, the methods according to the herein disclosed embodiments are suitable to be performed by a host server 200*a*, 200*b*, 200*c* residing in a cloud computational environment. Therefore, although a single processing circuitry 210 is illustrated in FIG. 2*a* the processing circuitry 210 may be distributed among a plurality of devices, or nodes. The same applies to the functional modules 210*a*-210*f* of FIG. 2*b* and the computer program 320 of FIG. 3 (see below).

Figure 3:
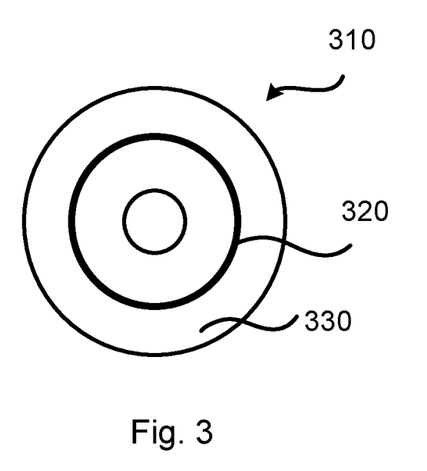
FIG. 3 shows one example of a computer program product comprising computer readable storage medium according to an embodiment.

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for verifying a log entry in a communications system, the method being performed by a host server, the method comprising:
   obtaining a log entry of a service access tracker, the log entry indicating access to a service during a client session, the service being tracked by the service access tracker;
   providing the log entry to a trusted third party during the client session for digital signing thereof using a digital trusted timestamping scheme;
   verifying during the client session that the log entry has been digitally signed by the trusted third party;
   providing a new aggregate comprising the digitally signed log entry and a previous aggregate of previously digitally signed and aggregated log entries to the trusted third party during the client session for digital signing thereof using the digital trusted timestamping scheme;
   verifying that the new aggregate has been digitally signed by the trusted third party;
   determining that verification of at least one of the log entry and the new aggregate fails; and
   responsive to determining that the verification of the at least one of the log entry and the new aggregate fails, disabling or limiting access to the server during the client session.

2. The method according to claim 1, wherein the service is run on a virtual machine hosted by the host server.

3. The method according to claim 1, further comprising:
   obtaining an indication that the service tracked by the service access tracker has been accessed; and
   determining, in response thereto, whether to obtain the log entry or not.

4. The method according to claim 1, further comprising:
   obtaining an indication of how many times the service has been accessed; and
   disabling or limiting access to the service if the service has been accessed more times than defined by a predefined threshold.

5. The method according to claim 4, further comprising:
   obtaining an indication of configuration of the predefined threshold; and
   providing the indication to the trusted third party for digital signing thereof using the digital trusted timestamping scheme.

6. The method according to claim 1, wherein the log entry comprises at least one of a boot timestamp, a timestamp of start of access to the service, and a random number having been generated at the start of the service.

7. The method according to claim 1, wherein the log entry comprises at least one of a virtual hardware identifier, a Media Access Control, MAC, address, and an Internet Protocol, IP, address of a virtual machine running the service.

8. The method according to claim 1, wherein the log entry is provided as a cryptographic hash of the log entry to the trusted third party.

9. The method according to claim 1, wherein the aggregate of previously digitally signed log entries comprises previously digitally signed log entries having been aggregated during a predefined time period.

10. The method according to claim 1, wherein verifying that the log entry has been digitally signed by the trusted third party comprises:
    identifying a hash of the log entry in a top hash of a hash tree provided by the trusted third party.

11. The method according to claim 1, wherein verifying that the new aggregate has been digitally signed by the trusted third party comprises:
    identifying a hash of the new aggregate in a top hash of a hash tree provided by the trusted third party.

12. The method according to claim 1, wherein the verifying that the new aggregate has been digitally signed is performed within a predefined time duration from having provided the new aggregate to the trusted third party for digital signing.

13. The method according to claim 1, further comprising:
    providing an indication of the log entry to a service utilization analyzer.

14. The method according to claim 13, wherein the indication is the digitally signed log entry.

15. The method according to claim 1, wherein the trusted third party is a Keyless Signature Infrastructure.

16. The method according to claim 1, wherein the digital trusted timestamping scheme is a hash-linking based digital timestamping scheme.

17. The method according to claim 16, wherein the hash-linking based digital timestamping scheme is a hash calendar.

18. The method of claim 1, wherein:
    the trusted third party comprises a local trusted third party and a global trusted third party;
    the local trusted third party and the global trusted third party are separated by a firewall; and
    the local trusted third party is logically located at the same side of the firewall as the host server.

19. A host server for verifying a log entry in a communications system, the host server comprising:
    processing circuitry; and
    a computer program product storing instructions that, when executed by the processing circuitry, causes the host server to:
       obtain a log entry of a service access tracker, the log entry indicating access to a service during a client session, the service being tracked by the service access tracker;
       provide the log entry to a trusted third party during the client session for digital signing thereof using a digital trusted timestamping scheme;
       verify during the client session that the log entry has been digitally signed by the trusted third party;
       provide a new aggregate comprising the digitally signed log entry and a previous aggregate of previously digitally signed and aggregated log entries to the trusted third party during the client session for digital signing thereof using the digital trusted timestamping scheme;
       verify that the new aggregate has been digitally signed by the trusted third party;
       determine that verification of at least one of the log entry and the new aggregate fails; and
       responsive to determining that the verification of the at least one of the log entry and the new aggregate fails, disable or limit access to the server during the client session.

20. The host server of claim 19, wherein:
the trusted third party comprises a local trusted third party and a global trusted third party;
the local trusted third party and the global trusted third party are separated by a firewall; and
the local trusted third party is logically located at the same side of the firewall as the host server.

21. A non-transitory computer program for verifying a log entry in a communications system, the computer program comprising computer code which, when run on processing circuitry of a host server, causes the host server to:
obtain a log entry of a service access tracker, the log entry indicating access to a service during a client session, the service being tracked by the service access tracker;
provide the log entry to a trusted third party during the client session for digital signing thereof using a digital trusted timestamping scheme;
verify during the client session that the log entry has been digitally signed by the trusted third party;
provide a new aggregate comprising the digitally signed log entry and a previous aggregate of previously digitally signed and aggregated log entries to the trusted third party during the client session for digital signing thereof using the digital trusted timestamping scheme;
verify that the new aggregate has been digitally signed by the trusted third party;
determine that verification of at least one of the log entry and the new aggregate fails; and
responsive to determining that the verification of the at least one of the log entry and the new aggregate fails, disable or limit access to the server during the client session.

22. The non-transitory computer program of claim 21, wherein:
the trusted third party comprises a local trusted third party and a global trusted third party;
the local trusted third party and the global trusted third party are separated by a firewall; and
the local trusted third party is logically located at the same side of the firewall as the host server.

\* \* \* \* \*